(12) United States Patent
Bruett et al.

(10) Patent No.: US 10,086,812 B2
(45) Date of Patent: Oct. 2, 2018

(54) HYDRAULIC BRAKING SYSTEM

(71) Applicant: WABCO GmbH, Hannover (DE)

(72) Inventors: Mirko Bruett, Ronnenberg (DE);
Volker Heinrich, Nordstemmen (DE);
Frank Zielke, Barsinghausen (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 15/546,667

(22) PCT Filed: Feb. 11, 2016

(86) PCT No.: PCT/EP2016/000230
§ 371 (c)(1),
(2) Date: Jul. 27, 2017

(87) PCT Pub. No.: WO2016/142028
PCT Pub. Date: Sep. 15, 2016

(65) Prior Publication Data
US 2018/0022334 A1   Jan. 25, 2018

(30) Foreign Application Priority Data

Mar. 10, 2015   (DE) ........................ 10 2015 003 201

(51) Int. Cl.
*B60T 8/48*  (2006.01)
*B60T 8/36*  (2006.01)
*B60T 8/34*  (2006.01)

(52) U.S. Cl.
CPC ............ *B60T 8/4827* (2013.01); *B60T 8/345* (2013.01); *B60T 8/3635* (2013.01); *B60T 8/3665* (2013.01)

(58) Field of Classification Search
CPC .... B60T 8/4827; B60T 8/4836; B60T 8/4845; B60T 8/4863; B60T 8/4872;
(Continued)

(56) References Cited

U.S. PATENT DOCUMENTS 5,054,861 A    10/1991   Resch
5,236,256 A *   8/1993   Schmidt .................. B60T 8/268
188/DIG. 1
(Continued)

FOREIGN PATENT DOCUMENTS

DE            3900852 C1    3/1900
DE            3714740 A1    11/1988
(Continued)

*Primary Examiner* — Vishal R Sahni
(74) *Attorney, Agent, or Firm* — Leydig, Voit & Mayer, Ltd.

(57) ABSTRACT

An external force-supported hydraulic braking system of a wheeled vehicle includes two brake circuits each having a main brake line configured to be connected to a pressure-carrying supply line or to a pressureless return line via a brake valve and further having a number of wheel brake lines branching from the main brake line and including a valve assembly of a TCS system. The valve assembly of the TCS system has a single TCS control valve formed as a 6/2-way magnetic switching valve configured to, in a non-actuated state, block a pressure-carrying main pressure line against two bypass lines each leading directly to a respective main brake line, and connect the two return lines to a pressureless collective line, and further configured to, in the actuated state, connect the main pressure line to the two bypass lines and block the two return lines against the collective line.

10 Claims, 8 Drawing Sheets

(58) Field of Classification Search
CPC ........ B60T 8/4881; B60T 8/489; B60T 8/345;
B60T 8/3665; B60T 8/3635
See application file for complete search history.

(56) References Cited

U.S. PATENT DOCUMENTS

| | | | |
|---|---|---|---|
| 5,855,417 A * | 1/1999 | Johnston | B60T 7/042 303/10 |
| 5,984,432 A * | 11/1999 | Otomo | B60T 7/042 303/113.1 |
| 6,053,582 A * | 4/2000 | Ganzel | B60T 8/4018 188/358 |
| 6,196,642 B1 | 3/2001 | Sekiguchi | |
| 2002/0033636 A1 | 3/2002 | Lulfing | |
| 2005/0242660 A1 | 11/2005 | Rouillard et al. | |
| 2006/0071543 A1* | 4/2006 | Nakayasu | B60T 8/348 303/113.1 |
| 2010/0187900 A1 | 7/2010 | Remmelmann et al. | |
| 2011/0018338 A1 | 1/2011 | Grepl et al. | |

FOREIGN PATENT DOCUMENTS

| | | |
|---|---|---|
| DE | 19546056 A1 | 6/1997 |
| DE | 19818754 A1 | 11/1998 |
| DE | 102008049551 A1 | 4/2009 |
| EP | 1013528 B1 | 6/2000 |
| WO | WO 2004020264 A1 | 3/2004 |
| WO | WO 2009138075 A1 | 11/2009 |

\* cited by examiner

HYDRAULIC BRAKING SYSTEM

CROSS REFERENCE TO RELATED APPLICATIONS

This application is a U.S. National Stage Application under 35 U.S.C. § 371 of International Application No. PCT/EP2016/000230 filed on Feb. 11, 2016, and claims benefit to German Patent Application No. DE 10 2015 003 201.1 filed on Mar. 10, 2015. The International Application was published in German on Sep. 15, 2016 as WO 2016/142028 A1 under PCT Article 21(2).

FIELD

The invention concerns an external force-supported hydraulic braking system of a wheeled vehicle.

BACKGROUND

Whereas cars and light goods vehicles usually have a hydraulic braking system supported by pedal force, and heavy goods vehicles have a pneumatic braking system supported by external force, wheeled vehicles such as e.g. construction machines and agricultural tractors, which are intended to be used off solid roads and paths, are equipped with an external force-supported hydraulic brake system. Because of the necessary high braking forces, the wheel brake cylinders of such wheeled vehicles have a relatively large displacement volume which can only be conveyed with an external force-supported braking system. Since construction machines and agricultural tractors normally use hydraulic working equipment or comprise a hydrostatic drive, an external force-supported hydraulic braking system can advantageously utilize the hydraulic pressure supply device which is present in any case.

In the present case, an external force-supported hydraulic braking system of a wheeled vehicle is assumed which has two brake circuits, a valve arrangement of an anti-lock braking system (ABS™ system), and a valve arrangement of a traction control system (TCS™ system). The brake circuits each have a brake valve which can be actuated by a brake pedal, by means of which a main brake line—from which several wheel brake lines branch off, each leading each to a wheel brake cylinder of the wheel brake—can be connected to a pressure-carrying supply line for actuation of the wheel brakes and to a pressureless return line for release of the wheel brakes.

The valve arrangement of the ABS system comprises several inlet valves, each with a check valve connected in parallel and opening in the direction of the respective main brake line, and several outlet valves. An inlet valve with a check valve and an outlet valve leading from the respective wheel brake cylinder to a return line are arranged at each wheel brake in the corresponding wheel brake line. In the non-actuated state, the inlet valves are opened and the outlet valves closed. If, during a braking process, by evaluation of rotation speed sensors assigned to the vehicle wheels, a locked vehicle wheel or one at risk of locking is established, the inlet valve of the assigned wheel brake cylinder is closed and the corresponding outlet valve opened, whereby the wheel brake of the vehicle wheel concerned is released. If, for example after releasing the brake pedal, a higher pressure is present in one of the wheel brake cylinders than in the assigned main brake line, this pressure is dissipated, when the inlet and outlet valves are closed, via the check valve connected in parallel to the inlet valve.

The TCS system also uses the inlet and outlet valves of the ABS system. If, when the wheeled vehicle moves away or accelerates, the rotation speed sensors arranged on the vehicle wheels detect a slipping drive wheel, a pressure-carrying pressure line is connected directly via the valve arrangement of the TCS system, i.e. bypassing the brake valves, to the main brake lines of the two brake circuits, and at the same time the return lines, which are connected to the main brake lines via the brake valves when the brake pedal is not actuated, are shut off. Immediately before this, the inlet valves of the brake cylinders of the non-driven vehicle wheels and the non-slipping drive wheels are closed, so that only the wheel brake of the slipping drive wheel is actuated. By braking the slipping drive wheel, the braking moment absorbed by the wheel brake there is active at the opposite drive wheel of the same drive axle via the differential to the same level as the drive moment, whereby the wheeled vehicle can move away or accelerate further. In comparison with a limited slip differential arranged on a drive axle, with which a traction loss on one drive wheel can also be prevented, a traction control system which acts via active brake intervention constitutes a relatively simple and significantly cheaper device.

DE 195 46 056 A1 describes an external force-supported hydraulic braking system of a motor vehicle with two brake circuits, an ABS system and a TCS system. The motor vehicle concerned for example has one drive axle and one non-driven vehicle axle. The wheel brake cylinders of the wheel brakes are distributed diagonally over the two brake circuits. For the TCS system, a pressure-carrying pressure line is provided which, bypassing the brake valves combined in the present case into a metering valve, leads from a pressure source with a branch to the wheel brake lines of the drive wheels. In a first embodiment, according to FIG. 1 there, the valve arrangement of the TCS system has a shut-off valve arranged before the branch in the pressure line and configured as a 2/2-way magnetic switching valve, and two check valves each arranged after the branch for infeed of the pressure medium. In a second embodiment, according to FIG. 2 there, the valve arrangement of the TCS system has two shut-off valves each arranged after the branch in the pressure line branches and configured as 2/2-way magnetic switching valves, for infeed of the pressure medium. Also, both embodiments of the valve arrangement of the TCS system each have, in each brake circuit, an isolating valve arranged between the branch of the main brake line and the opening of the respective pressure line branch into the wheel brake line and configured as a 2/2-way magnetic switching valve, to prevent the outflow of pressure medium.

EP 1 013 528 B1 describes various embodiments of a hydraulic brake system of a wheeled vehicle with two brake circuits and an actuation of wheel brakes independently of the brake valves, in which the actuation valves of the valve arrangement are arranged between the respective brake valve and the pressure supply device. The motor vehicle concerned has for example two vehicle axles. The wheel brake cylinders of the wheel brakes are divided per axle over the two brake circuits. Due to the valve arrangement, only the wheel brakes of one brake circuit or one vehicle axle can be actuated.

SUMMARY

In an embodiment, the present invention provides an external force-supported hydraulic braking system of a wheeled vehicle. The external force-supported hydraulic braking system includes two brake circuits each having a main brake line configured to be connected to a pressure-carrying supply line or to a pressureless return line via a brake valve and further having a number of wheel brake lines branching from the main brake line and each leading to a wheel brake cylinder of a wheel brake, including a valve assembly of an ABS system which at each wheel brake has an inlet valve, with a check valve connected in parallel, arranged in the corresponding wheel brake line, and an outlet valve leading from the respective wheel brake cylinder into a return line, and including a valve assembly of a TCS system, by means of which a pressure line can be connected directly to the main brake lines and the return lines can be blocked. The valve assembly of the TCS system has a single TCS control valve formed as a 6/2-way magnetic switching valve configured to, in a non-actuated state, block a pressure-carrying main pressure line against two bypass lines each leading directly to a respective main brake line, and connect the two return lines to a pressureless collective line, and further configured to, in the actuated state, connect the main pressure line to the two bypass lines and block the two return lines against the collective line.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The invention concerns an external force-supported hydraulic braking system of a wheeled vehicle, comprising two brake circuits each having a main brake line that can be connected to a pressure-carrying supply line or to a pressureless return line via a brake valve, and having a number of wheel brake lines branching from same and each leading to a wheel brake cylinder of a wheel brake, comprising a valve assembly of an ABS system which at each wheel brake has an inlet valve, with a check valve connected in parallel, arranged in the corresponding wheel brake line, and an outlet valve leading from the respective wheel brake cylinder into a return line, and comprising a valve assembly of a TCS system, by means of which a pressure line can be connected directly to the main brake lines and the return lines can be blocked.

Embodiments of the present invention propose a hydraulic braking system of the type described in the preceding paragraph in which the TCS system includes the wheel brakes of both brake circuits, and the valve arrangement of the TCS system is simplified in control terms in connection with a high control dynamic and takes up less construction space in comparison with known valve arrangements.

According to an embodiment of the present invention, a valve assembly of the TCS system has a single TCS control valve formed as a 6/2-way magnetic switching valve, via which, in the non-actuated state, a pressure-carrying main pressure line is blocked against two bypass lines each leading directly to a respective main brake line, and the two return lines are connected to a pressureless collective line, and via which, in the actuated state, the main pressure line is connected to the two bypass lines and the two return lines are blocked against the collective line.

Accordingly, an external force-supported hydraulic braking system of a wheeled vehicle comprises two brake circuits, each of which has a main brake line which can be connected via a brake valve to a pressure-carrying supply line or to a pressureless return line, and several wheel brake lines branching from same and each leading to a wheel brake cylinder of the wheel brake. The hydraulic braking system also comprises a valve arrangement of an ABS system which at each wheel brake has an inlet valve, with a check valve connected parallel thereto, arranged in the respective wheel brake line and an outlet valve leading from the respective wheel brake cylinder to a return line. Also, a valve arrangement of a TCS system is provided by means of which, to activate a traction control system, a pressure-carrying pressure line can be connected to the main brake lines directly, i.e. bypassing the brake valves, and the return lines departing from the brake valves can be blocked.

According to embodiments of the invention, the function of the valve arrangement of the TCS system is fulfilled by a single TCS control valve configured as a 6/2-way magnetic switching valve, via which, in non-actuated state, a pressure-carrying main brake line can be shut off from two bypass lines each leading directly to one of the main brake lines, i.e. bypassing the respective brake valve, and the return lines departing from the brake valves are connected to a pressureless collective line, and via which, in actuated state, the main pressure line is connected to the two bypass lines, and the two return lines are blocked from the collective line.

To activate the traction control system, as well as actuating the TCS control valve, it is necessary to close only the inlet valves of the ABS system for the wheel brakes which are not to be actuated. By actuating or switching the TCS control valve, the main brake lines of the two brake circuits are connected to the main brake line for infeed of pressure medium, and the return lines are blocked to prevent an outflow of pressure medium via the opened brake valves. A corresponding hydraulic braking system of the type described initially without a TCS system can therefore be extended with a TCS system with relatively little additional control complexity and little additional space requirement.

The TCS control valve of the TCS system is preferably configured as a slide valve with a control piston which has four control grooves and is guided so as to move axially in a valve bore of a valve casing, wherein the port for the main pressure line branches inside the valve casing into two switching channels which open radially into the valve bore at two mutually spaced axial positions, and in the actuated state of the TCS control valve are each connected via two control grooves of the control piston to a joining channel of the bypass lines, and wherein the port for the collective line branches inside the valve casing into two switching channels which open radially into the valve bore at two further mutually spaced axial positions, and in the non-actuated state of the TCS control valve are each connected via two further control grooves of the control piston to a joining channel of the return lines departing from the brake valves.

Because of the internal branching of the ports of the main pressure line and the collective line, and their switched connection to the bypass and return lines via a respective control groove of the control piston, the volume flows to be switched and the switching forces required for this are relatively low. Switching the TCS control valve by powering the electromagnet requires a relatively low control current. Also, the TCS control valve therefore has a high switching dynamic, i.e. short reaction times when the control current is switched on and off.

To further increase the switching dynamics of the TCS control valve, the control piston can be pressure-relieved axially and radially, whereby low switching forces are required and seizing of the control piston is avoided.

For axial pressure relief of the control piston, the TCS control valve advantageously has two vent channels, which lead inside the valve casing from the two end faces of the valve bore to a respective switching channel of the collective line. Pressure medium reaching the end faces of the valve bore due to leakage is therefore pressed into the vent channels with relatively low resistance on axial displacement of the control piston, and from there flows back via the collective line port into the storage container.

For radial pressure relief, the control piston is provided with annular pressure relief grooves arranged at axial positions at which, in non-actuated or actuated state of the TCS control valve, a respective joining or switching channel opens into the valve bore outside the control grooves of the control piston. The pressure present at the opening of the respective joining or switching channel into the valve bore is distributed around the periphery by the respective pressure relief groove, so that a radial transverse force acting on the control piston and the resulting increased friction between the control piston and the inner wall of the valve bore are avoided.

To reduce the production and assembly cost, the inlet valves and the outlet valves of the ABS system are configured as identical 2/2-way magnetic switching valves, and for each wheel brake cylinder are arranged axially parallel and together with the respective check valve in a valve block with a common valve casing.

As an alternative to the otherwise usual seat valves and to increase the switching dynamics, according to a refinement of the invention, the inlet valves and the outlet valves can each be configured as slide valves with a control piston having a single control groove and guided so as to move axially in a valve bore of the valve casing, of which the port for the output-side portion of the wheel brake line leading directly to the wheel brake cylinder branches inside the valve casing into two switching channels which open radially into the valve bore of the inlet valve or outlet valve respectively at two mutually spaced axial positions, and of which, in the non-actuated state of the inlet valve, the one switching channel is connected via the assigned control groove to a joining channel of the input-side portion of the wheel brake line branching from the main brake line, and in the actuated state of the outlet valve, the other switching channel is connected via the assigned control groove to a joining channel of a return line leading to the storage container.

In order to achieve a high switching dynamic for the ABS system and the TCS system at the inlet and outlet valves, the switching valves are also configured with axial and radial pressure relief.

For axial pressure relief of the respective control piston, according to an advantageous refinement, the inlet valve and the outlet valve each have two vent channels which lead inside the valve casing from the two end faces of the respective valve bore to the joining channel of the return line. Pressure medium reaching the end faces of the valve bores due to leakage is therefore pressed into said vent channels with relatively low resistance on axial displacement of the respective control piston, and from there flows back via the return line port into the storage container.

For radial pressure relief, the control pistons of the inlet valve and the outlet valve can advantageously each be fitted with a pressure relief groove arranged at an axial position at which, in the actuated state of the inlet valve and the non-actuated state of the outlet valve, a joining or switching channel respectively opens into the assigned valve bore outside the control groove of the respective control piston. The pressure guided to the opening of the joining or switching channel into the valve bore is distributed around the periphery by the respective pressure relief groove, so that a radial transverse force acting on the control piston concerned and the resulting increased friction between the respective control piston and the inner wall of the valve bore are avoided.

The check valve, via which the pressure in the respective wheel brake cylinder which is higher than in the assigned main brake line can be relieved, according to one embodiment has a ball pressed by a valve spring against a valve seat, and is arranged in a valve bore of the valve casing which is connected inside the valve casing on the end side to the port for the output-side portion of the wheel brake line and outside the valve seat, i.e. in the region of the valve spring, to the port for the input-side portion of the wheel brake line.

To further improve the ABS and TCS systems, advantageously the pressures prevailing in the wheel brake cylinders are detected by sensors, which according to one embodiment is achieved in that a pressure sensor is connected at each output-side portion of a wheel brake line and is connected via a signal line to a control unit of the ABS and TCS system.

Figure 8:
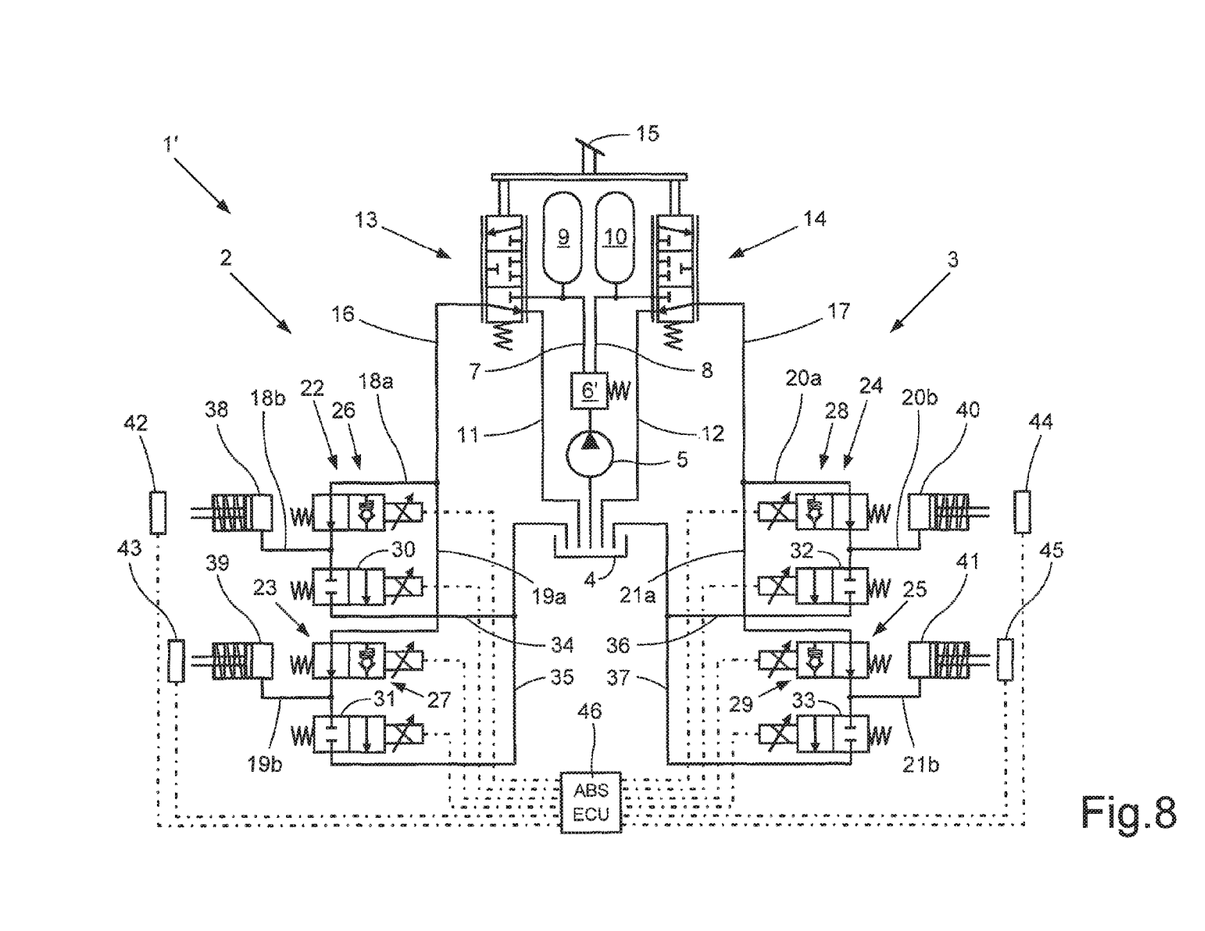
FIG. 8 depicts a hydraulic braking system considered known, in a diagrammatic overview depiction.

FIG. 8 shows an external force-supported hydraulic braking system 1' known in principle, with two brake circuits 2, 3 of a wheeled vehicle with two vehicle axles, in a diagrammatic overview.

Each of the two brake circuits 2, 3 has a main brake line 16, 17 to which two wheel brake cylinders 38, 39; 40, 41 of wheel brakes (not shown in more detail) of vehicle wheels of the two vehicle axles are connected. With regard to their arrangement on the vehicle axles, the wheel brake cylinders 38, 39; 40, 41 may be distributed by axles, by sides or diagonally over the two brake circuits 2, 3. Via a mechanically actuatable brake valve 13, 14 configured as a 3/3-way control valve, the main brake lines 16, 17 of the two brake circuits 2, 3 can each be connected to a pressure-carrying supply line 7, 8 or a pressureless return line 11, 12. The two brake valves 13, 14 are mechanically coupled and can be actuated by means of a common brake pedal 15.

The supply lines 7, 8 are connected to a common shut-off valve 6', in which the pressure of a pressure medium conveyed by a pump 5 from the storage container 4 is limited and surplus pressure medium is returned, in a manner not shown, via secondary consumers or directly to the storage container 4.

A pressure accumulator 9, 10 is connected to each supply line 7, 8. The return lines 11, 12 lead directly back to the storage container 4. Therefore, via the brake valves 13, 14, a pressure of varying level, depending on the position of the brake pedal 15, is fed into the main brake lines 16, 17. When the brake pedal 15 is released and hence brake valves 13, 14 are at their rest position, the main brake lines 16, 17 are connected to the assigned return lines 11, 12 and are then switched so as to be pressureless.

The two main brake lines 16, 17 each branch into two wheel brake lines 18, 19; 20, 21, each of which leads to one of the wheel brake cylinders 38, 39; 40, 41 of the respective brake circuit 2, 3. Each wheel brake line 18, 19; 20, 21 has two portions, marked with reference symbols 18a, 18b; 19a, 19b; 20a, 20b; 21a, 21b. An inlet valve 22, 23; 24, 25 configured as a 2/2-way magnetic switching valve is arranged in each case between two portions 18a, 18b; 19a, 19b; 20a, 20b; 21a, 21b of the wheel brake lines 18, 19; 20, 21 and is open in the non-actuated i.e. unpowered state. A check valve 26, 27; 28, 29 opening in the direction of the respective main brake line 16, 17 is connected in parallel to each inlet valve 22, 23; 24, 25.

An outlet valve 30, 31; 32, 33 configured as a 2/2-way magnetic switch valve is connected to the output-side portion of the wheel brake line 18b, 19b; 20b, 21b leading directly to the respective wheel brake cylinder 38, 39; 40, 41, and a return line 34, 35; 36, 37 leads into the storage container 4 from each of said valves which are closed in the non-actuated i.e. unpowered state.

The inlet valves 22, 23; 24, 25 and the outlet valves 30, 31; 32, 33 provided with the parallel-connected check valves 26, 27; 28, 29, like the rotation speed sensors 42, 42; 44, 45 arranged on the vehicle wheels of the two vehicle axles, are part of an ABS system and are connected to the ABS control unit 46 by electrical control and sensor lines depicted as dotted lines in FIG. 8.

If, during a braking process, by comparison of the wheel rotation speeds established by the rotation speed sensors 42, 43; 44, 45, a locked vehicle wheel or one at risk of locking is detected, the pressure prevailing in the respective wheel brake cylinder 38, 39; 40, 41 is initially lowered by closing the assigned inlet valve 22, 23; 24, 25 and opening the assigned outlet valve 30, 31; 32, 33, and then the pressure is modulated by alternate blocking and actuation of the inlet and outlet valves. If then a lower pressure is set in the main brake lines 16, 17 by retraction of the brake pedal 15, and a higher pressure prevails in one of the wheel brake cylinders 38, 39; 40, 41 than in the assigned main brake line 16, 17 while the inlet and outlet valves are closed, this brake pressure is dissipated via the respective check valve 26, 27; 28, 29.

Figure 1:
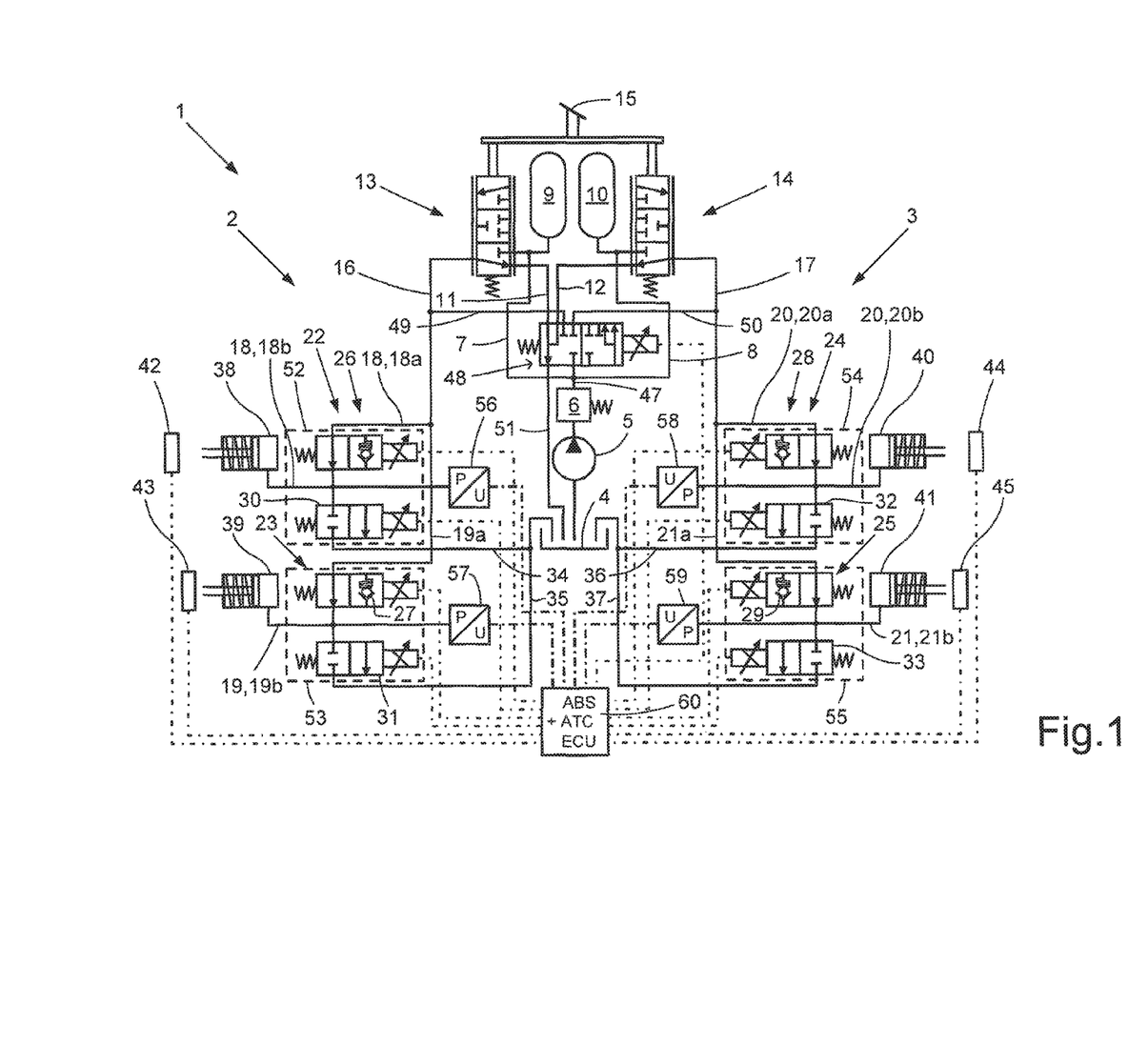
FIG. 1 depicts a hydraulic braking system according to an embodiment of the invention in a diagrammatic overview depiction.

The diagrammatic overview drawing in FIG. 1 shows a circuit diagram of a hydraulic braking system 1 of a wheeled vehicle with all-wheel drive, which is based on the hydraulic braking system 1' of FIG. 8 and extended by a valve arrangement of a TCS system, i.e. a traction control device.

In a first embodiment, according to FIG. 1 there, the valve arrangement comprises a single TCS control valve configured as a 5/2-way magnetic switching valve, via which the supply line of a brake circuit can be connected to a bypass line leading directly to the respective main brake line, and the return line of the same brake circuit can be shut off. The same function is fulfilled in a second embodiment of the valve arrangement, according to FIG. 2 there, with a TCS control valve configured as a 4/2-way magnetic switching valve.

Figure 3:
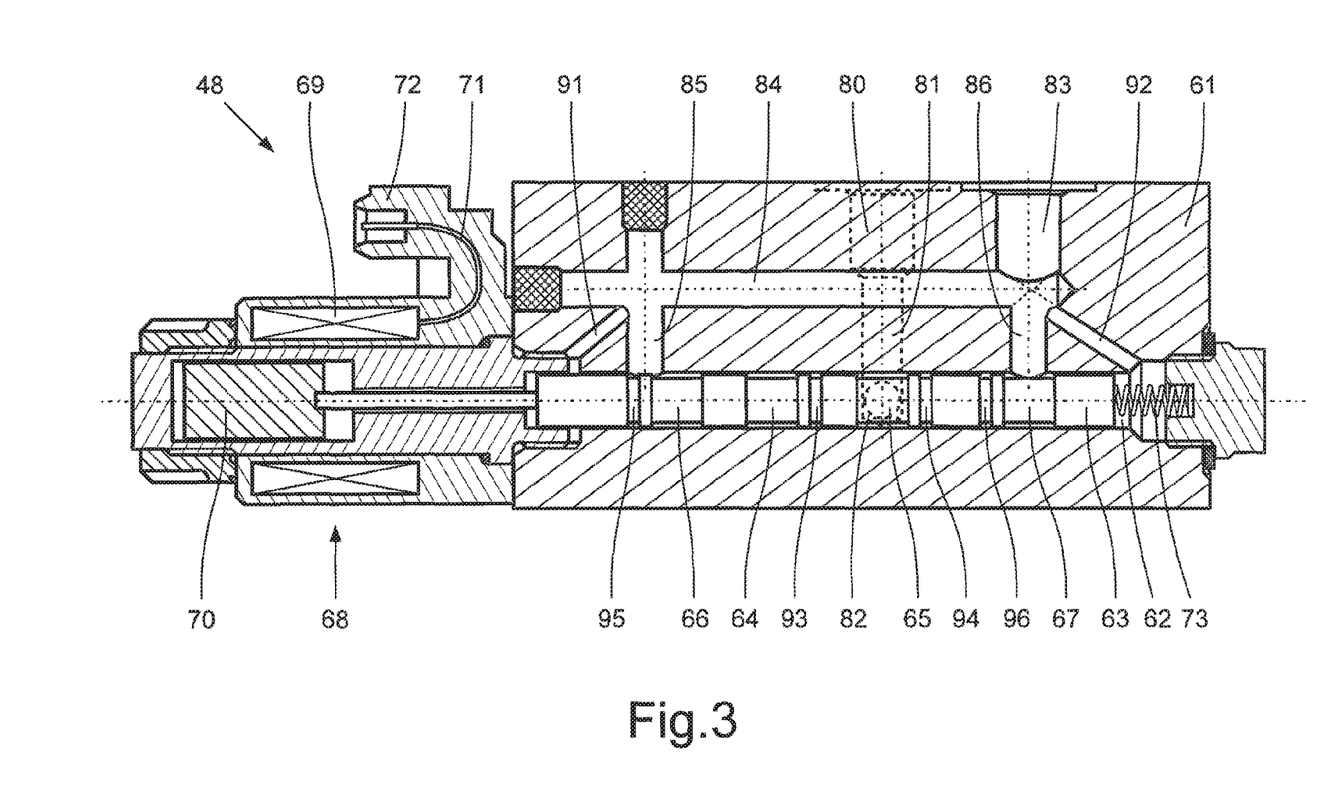
FIG. 3 depicts the TCS control valve according to FIG. 2 in a second longitudinal section.

In a third embodiment, according to FIG. 3 there, the valve arrangement there assigned to a TCS system comprises two TCS control valves each configured as a 2/2-way magnetic switching valve. The one control valve, closed in non-actuated state, is arranged in a bypass line which leads from the supply line of a brake circuit directly to the main brake line concerned. The other control valve, open in non-actuated state, is arranged in the return line of the same brake circuit which leads from the assigned brake valve to a storage container. When this known valve arrangement for the TCS system is used in an all-wheel drive vehicle with two drive axles and two brake circuits, consequently two 5/2-way magnetic switching valves or two 4/2-way magnetic switching valves or four 2/2-way magnetic switching valves would be required.

The valve arrangement of the TCS system comprises a single TCS control valve 48 configured as a 6/2-way magnetic switching valve, via which in non-actuated state a pressure-carrying main pressure line 47 is blocked against two bypass lines 49, 50, each leading directly to one of the main brake lines 16, 17, and the return lines 11, 12 departing from the two brake valves 13, 14 are connected to a pressureless collective line 51, and via which in actuated state the main pressure line 47 is connected to the two bypass lines 49, 50 and the two return lines 11, 12 are blocked against the collective line 51.

The main pressure line 47 is now connected to the shut-off valve 6, and the supply lines 7, 8 branch from this main pressure line 47. The inlet and outlet valves 22, 23, 24, 25; 30, 31, 32, 33 and the check valves 26, 27, 28, 29 are in the present case combined in a valve block 52, 53, 54, 55 of identical structure for each wheel brake cylinder 38, 39, 40, 41.

In order to detect precisely the pressures prevailing in the wheel brake cylinders 38, 39, 40, 41, a pressure sensor 56, 57, 58, 59 is connected to each of the output-side portions of the wheel brake lines 18b, 19b, 20b, 21b. The TCS control valve 48 and the pressure sensors 56, 57, 58, 59, and also the inlet and outlet valves 22, 23, 24, 25; 30, 31, 32, 33 and the rotation speed sensors 42, 43, 44, 45, are connected to a common ABS and TCS control unit 60 via electrical control and sensor lines shown as dotted lines in FIG. 1.

When the TCS control valve 48 is not actuated, the function of the hydraulic braking system 1 is identical to the hydraulic braking system 1' in FIG. 8. If, during a starting process or on acceleration of the wheeled vehicle, the spinning of a drive wheel is established at one of the rotation speed sensors 42, 43, 44, 45, then—in order to activate the traction control system—firstly for example the inlet valves 23, 24, 25 of the non-spinning drive wheels are closed and thereafter the TCS control valve 48 is actuated, i.e. switched. Actuation of the TCS control valve 48 connects the bypass lines 49, 50 to the main pressure line 47 for feeding the pressure medium into the main brake lines 16, 17, and blocks the return lines 11, 12 against the collective line 51 in order to prevent an outflow of pressure medium via the brake valves 13, 14. Thus by actuation of the assigned wheel brake cylinder, here for example wheel brake cylinder 38, the spinning drive wheel is braked. The brake moment absorbed by the wheel brake concerned is active via the axle differential on the opposite drive wheel of the same drive axle as a drive moment, so that the wheeled vehicle can move away or accelerate further.

When the rotation speed sensors 42, 43, 44, 45 detect a certain acceleration of the wheeled vehicle and largely equal wheel rotation speeds, the brake pressure in the wheel brake cylinder 38 concerned is dissipated again by actuation of the assigned inlet and outlet valves 22, 30. At the latest on actuation of the brake valves 13, 14 via the brake pedal 15, the traction control process is ended in that the TCS control valve 48 and the inlet and outlet valves 22, 23, 24, 25; 30, 31, 32, 33 are switched to be unpowered and hence return to the rest position. If one inlet valve, e.g. inlet valve 22, should seize in the closed state, the brake pressure enclosed in the respective wheel brake cylinder 38 is then dissipated via the assigned check valve 26.

The structure of a preferred embodiment of the TCS control valve 48 is explained below with reference to the longitudinal sections depicted in FIGS. 2 and 3. The TCS control valve 48 is configured as a slide valve with a control piston 63 which is guided so as to be able to move axially in a valve bore 62 of the valve casing 61 and has four annular control grooves 64, 65, 66, 67. The control piston 63 may be moved axially against the return force of a valve spring 73 arranged axially opposite by means of a magnet rotor 70 of an electromagnet 68, the magnetic coil 69 of which is connected via a cable 71 to the contacts of a plug socket 72.

Figure 2:
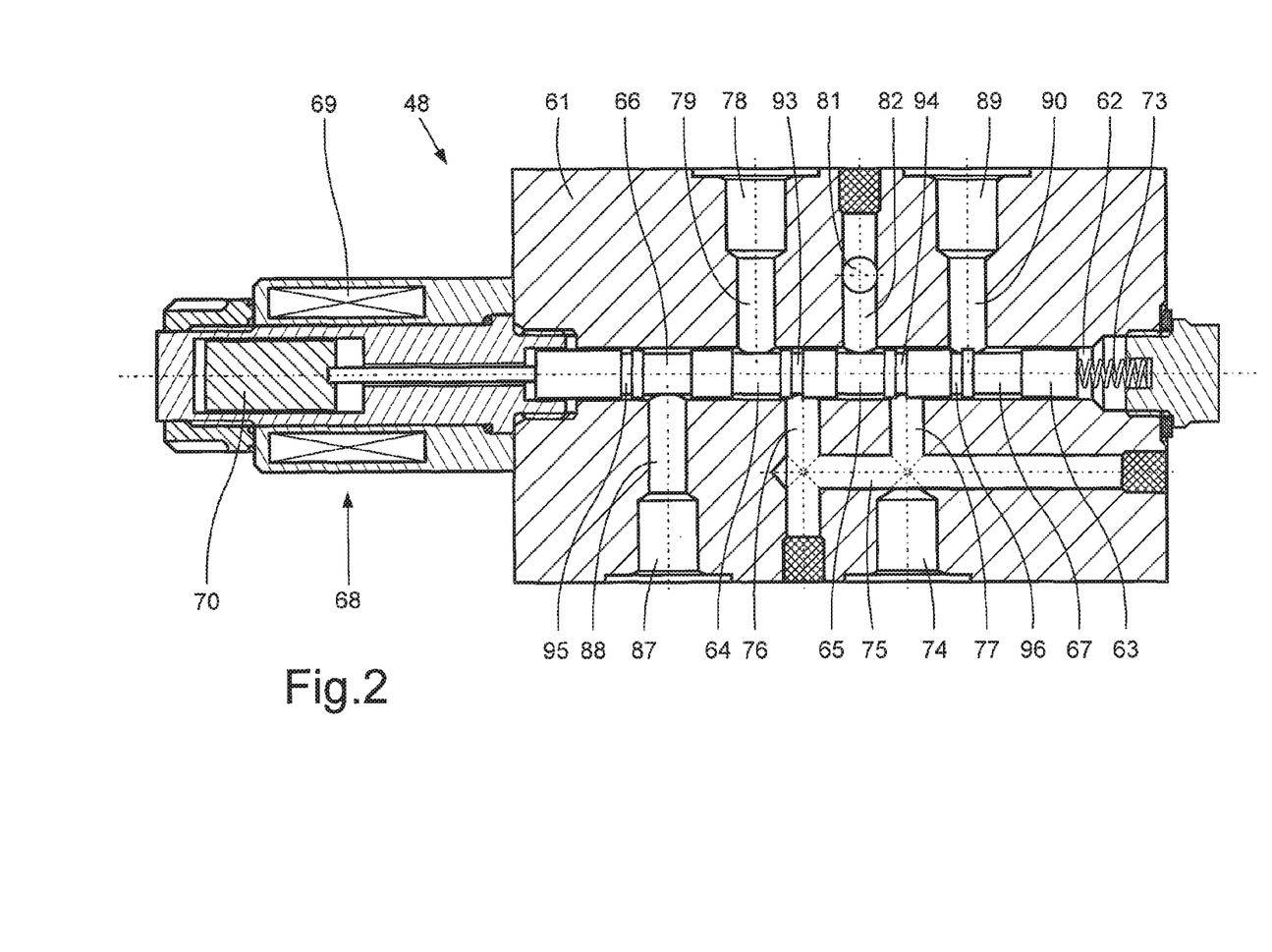
FIG. 2 depicts a TCS control valve of the hydraulic braking system according to FIG. 1, in a first longitudinal section.

The port 74 of the main pressure line 47 lying in the section plane of FIG. 2 branches inside the valve casing 61 into two switching channels 76, 77 which open radially into the valve bore 62 at two mutually spaced axial positions, and in the actuated state of the TCS control valve 48 are connected via two control grooves 64, 65 of the control piston 63 to a respective joining channel 79, 82 of the bypass lines 49, 50. Whereas the first switching channel 76 is connected via a connecting channel 75 to the port 74 of the main pressure line 47, the second switching channel 77 directly adjoins this port 74 as a coaxial extension.

The port 78 of the first bypass line 49 lying in the section plane of FIG. 2 transforms directly into the coaxially arranged joining channel 79, whereas the port 80 of the second bypass line 50, which is arranged parallel to the section plane of FIG. 3 and therefore drawn only in dotted lines in FIG. 3, is connected via a coaxial connecting channel 81 to the joining channel 82 lying in the section plane of FIG. 2.

The port 83 of the collective line 51 lying in the section plane of FIG. 3 branches inside the valve casing 61 into two switching channels 85, 86 which open radially into the valve bore 62 at two further mutually spaced axial positions, and in non-actuated state of the TCS control valve 48 are connected via two further control grooves 66, 67 of the control piston 63 to a respective joining channel 88, 90 of the return lines 11, 12 departing from the brake valves 13, 14. Whereas the first switching channel 85 is connected via a connecting channel 84 to the port 83 of the collective line 51, the second switching channel 86 directly adjoins this port 83 as a coaxial extension. The ports 87, 89 of the two return lines 11, 12 lying in the section plane of FIG. 2 each transform directly into a coaxial joining channel 88, 90.

For axial pressure relief of the control piston 63, the TCS control valve 48 has two vent channels 91, 92 which, in the section plane of FIG. 3, lead inside the valve casing 61 from the two end faces of the valve bore 62 to a respective switching channel 85, 86 of the collective line 51. Pressure medium reaching the end face of the valve bore 62 due to leakage is therefore pressed with relatively low resistance into the vent channels 91, 92 on axial displacement of the control piston 63, and from there flows back into the storage container 4 via the port 83 of the collective line 51.

For radial pressure relief, the control piston 63 has annular pressure relief grooves 93, 94, 95, 96 arranged at axial positions at which, in the non-actuated or actuated state of the TCS control valve 48, a joining or switching channel 76, 77, 85, 90 opens into the valve bore 62 outside the control grooves 64, 65, 66, 67 of the control piston 63. The pressure prevailing at the opening of the respective joining or switching channel 76, 77, 85, 90 into the valve bore 62 is distributed around the periphery by the respective pressure relief groove 93, 94, 95, 96, so that a radial transverse force acting on the control piston 63 and a resulting increased friction between the control piston 63 and the inner wall of the valve bore 62 are avoided.

A preferred embodiment of the identical valve blocks 52, 53, 54, 55 is explained below with reference to the example of the valve block 52 assigned to the wheel brake cylinder 38, using the longitudinal sections depicted in FIGS. 4 to 7.

Figure 4:
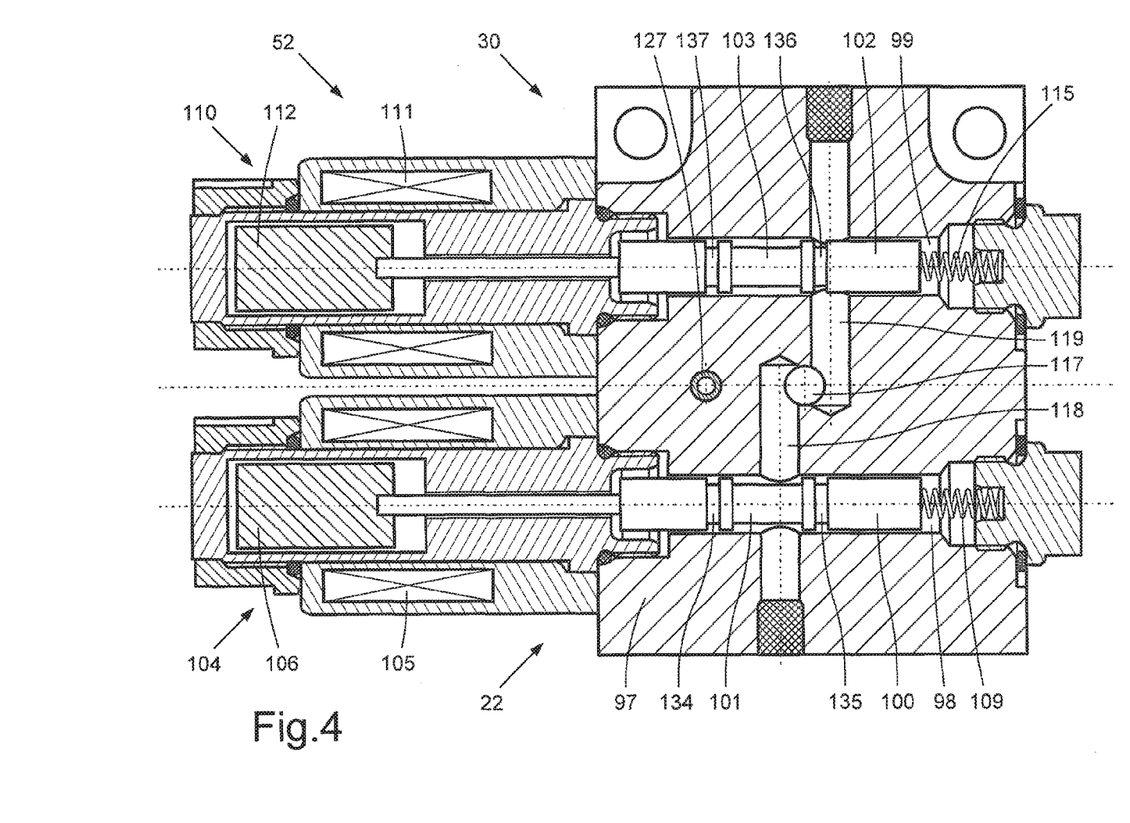
FIG. 4 depicts a valve block comprising an inlet valve, an outlet valve and a check valve, of the hydraulic braking system according to FIG. 1, in a first longitudinal section.

The inlet valve 22 and the outlet valve 30 are each configured as largely identical 2/2-way magnetic switching valves, each of which is configured as a slide valve with a control piston 100, 102 having a single control groove 101, 103 and guided so as to move axially in a valve bore 98, 99 of a common valve casing 97; said valves are arranged axially parallel in the valve casing 97. The control pistons 100, 101 of the inlet valve 22 and outlet valve 30 are each connected via a coupling rod to the magnet rotor 106, 112 of a respectively assigned electromagnet 104, 110. The return force of an assigned valve spring 109, 115 acts on the axial end of the control pistons 100, 102 remote from the rotor. The magnetic coils 105, 111 of the two electromagnets 104, 110 are each connected via a respective cable 107, 113 to the contacts of a plug socket 108, 114.

The port 116 of the output-side portion 18b of the wheel brake line 18 branches inside the valve casing 97 into two switching channels 118, 119 which open radially into the valve bore 98, 99 of the inlet valve 22 or outlet valve 30 at two mutually spaced axial positions. The switching channels 118, 119 lying in the section plane of FIG. 4 are connected via a joining channel 117 to the port 116 of the output-side portion 18b of the wheel brake line 18, which lies in the section plane of FIG. 7 together with the joining channel 117 arranged coaxially thereto.

Figure 5:
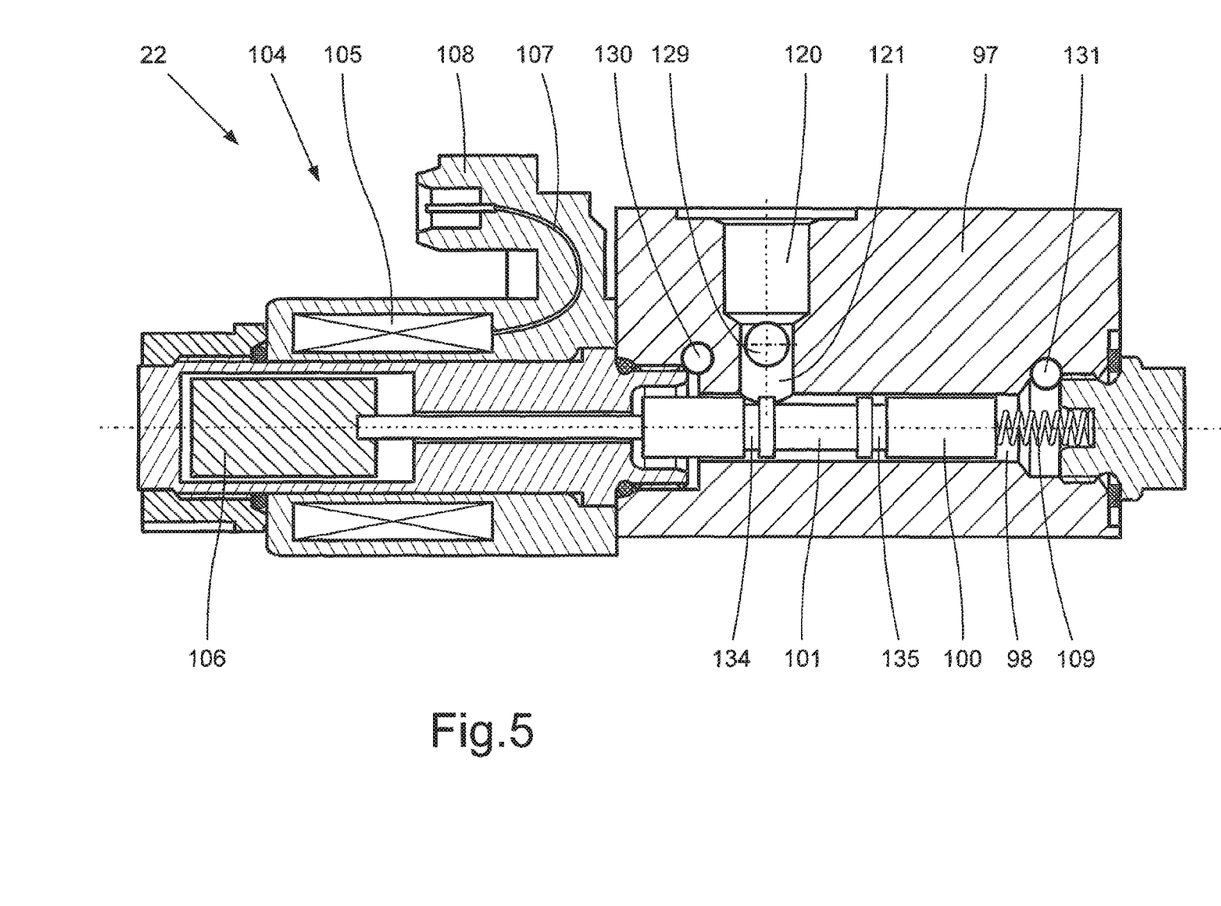
FIG. 5 depicts the inlet valve of the valve block according to FIG. 4, in a second longitudinal section.
Figure 6:
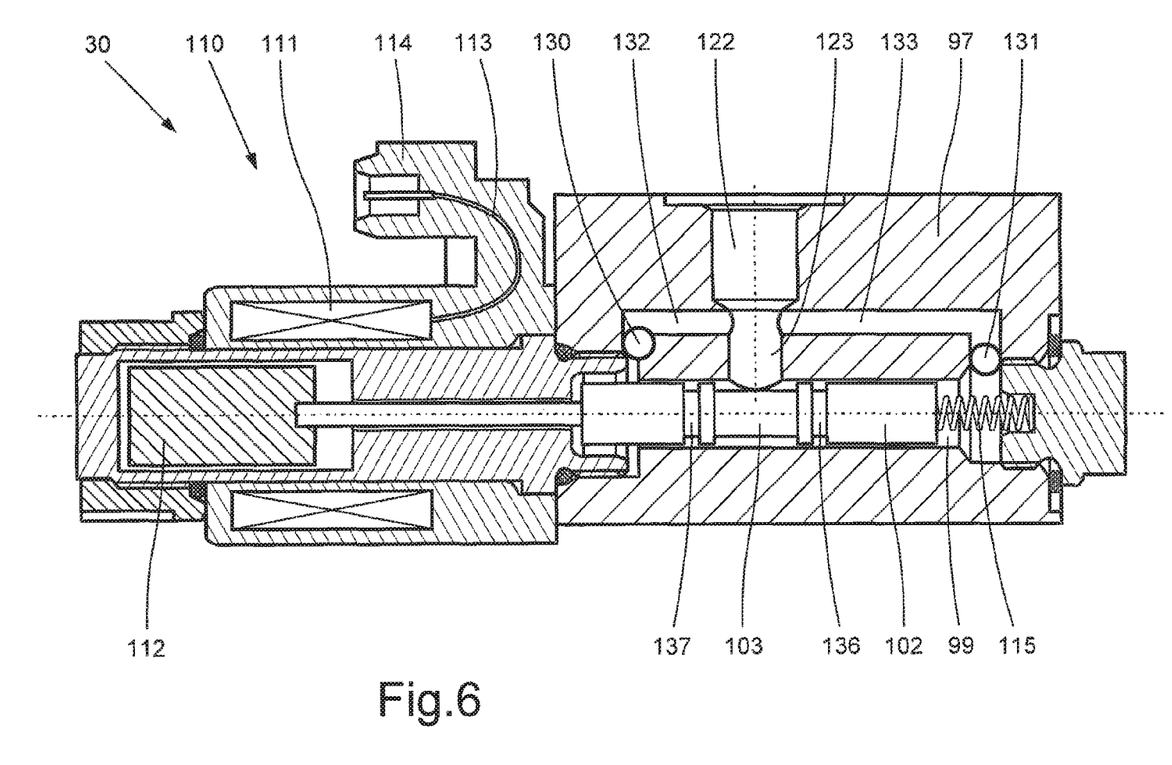
FIG. 6 depicts the outlet valve of the valve block according to FIG. 4, in a third longitudinal section.

In the non-actuated state of the inlet valve 22, the one switching channel 118 is connected via the assigned control groove 102 to a joining channel 121 of the input-side portion 18a of the wheel brake line 18 which branches from the main brake line 16 and lies in the coaxial extension of the respective port 120 in the section plane of FIG. 5. In the actuated state of the outlet valve 30, the other switching channel 119 is connected via the assigned control groove 103 to a joining channel 123 of the return line 34 leading to the storage container 4, which lies in the coaxial extension of the respective port 122 in the section plane of FIG. 6.

Figure 7:
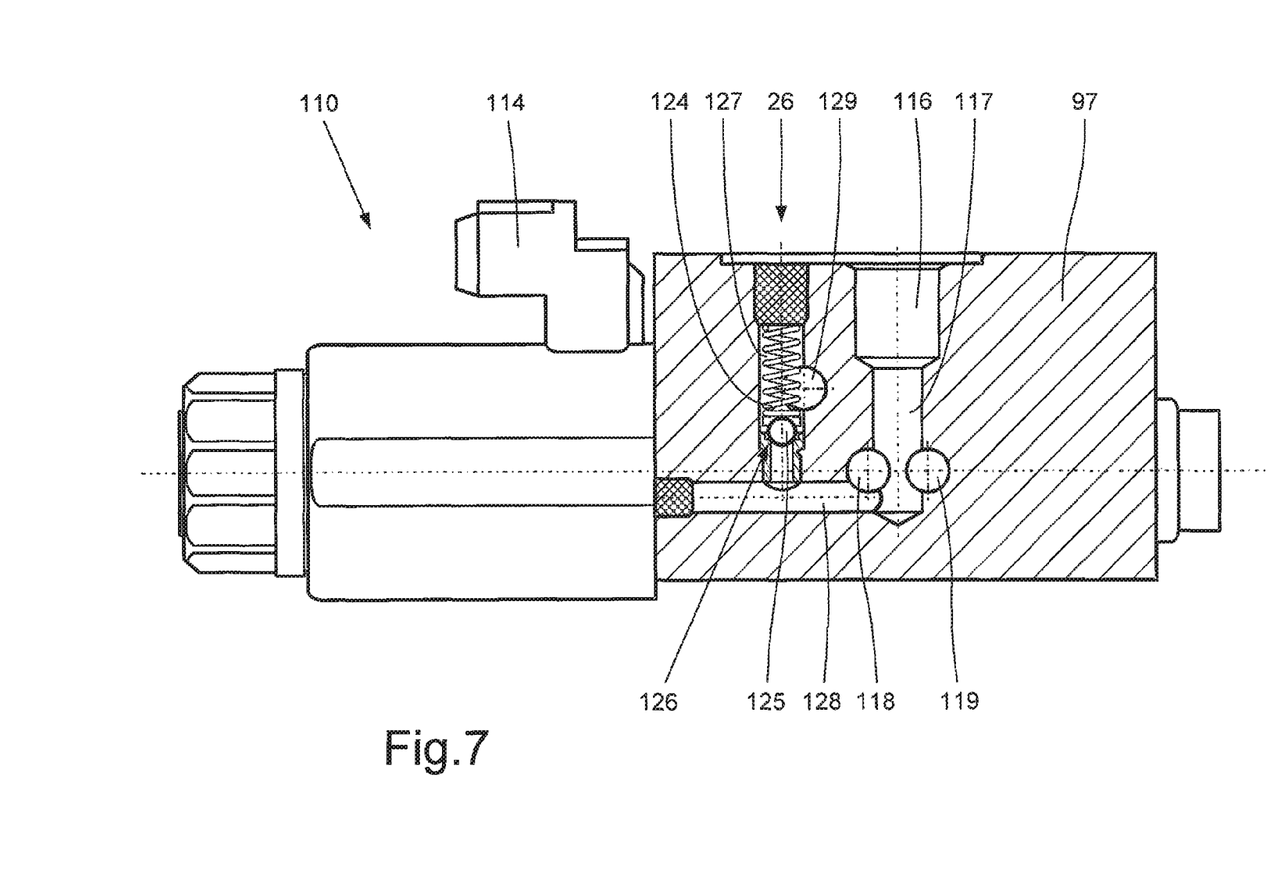
FIG. 7 depicts the check valve of the valve block according to FIG. 4, in a fourth longitudinal section.

The check valve 26 has a ball 125 pressed by a valve spring 124 against the valve seat 126, and is arranged in a valve bore 127 of the valve casing 97 lying in the section plane of FIG. 7. This valve bore 127 opens at the end into a connecting channel 128 which is arranged axially parallel to the valve bores 98, 99 of the inlet valve 22 and outlet valve 30 inside the valve casing 97, and is connected via the joining channel 117 to the port 116 of the output-side portion 18b of the wheel brake line 18. The valve bore 127 of the check valve 26 is connected in the region of the valve spring 124 outside the valve seat 126, via a further connecting channel 129 and the respective joining channel 121, to the port 120 of the input-side portion 18a of the wheel brake line 18. Thus as intended, the check valve 26 ensures a pressure dissipation in the wheel brake cylinder 38 if the pressure prevailing there is higher than the pressure present in the main brake line 16.

In a similar fashion to the TCS control valve 48, the inlet valve 22 and the outlet valve 30 each have two vent channels 130, 131; 132, 133 which, inside the valve casing 97, lead from the two end faces of the respective valve bore 98, 99 to the joining channel 123 of the return line 34. The vent channels 130, 131 of the inlet valve 22, which branch off close to the section plane of FIG. 5, each open into one of the vent channels 132, 133 of the outlet valve 30 lying in the drawing plane of FIG. 6, which in turn lead to the joining channel 123 of the return line 34.

Similarly, for radial pressure relief, the control pistons 100, 102 of the inlet valve 22 and outlet valve 30 are each provided with an annular pressure relief groove 134, 136 arranged at a respective axial position at which, in the actuated state of the inlet valve 22, the joining channel 121 of the input-side portion 18*a* of the wheel brake line 18, and in the non-actuated state of the outlet valve 30, the switching channel 119 of the output-side portion 18*b* of the wheel brake line 18, open into the assigned valve bore 98, 99 outside the control groove 101, 103 of the respective control piston 100, 102. The two ring grooves 135, 137 present on the control piston 100, 102 of the inlet valve 22 and outlet valve 30 are based on the largely identical design of the valves 22, 30 and in the present case have no special function.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1, 1' Braking system
2 First brake circuit
3 Second brake circuit
4 Storage container
5 Pump
6, 6' Shut-off valve
7 Supply line
8 Supply line
9 First pressure accumulator
10 Second pressure accumulator
11 First return line
12 Second return line
13 Brake valve
14 Brake valve
15 Brake pedal
16 First main brake line
17 Second main brake line
18 Wheel brake line
18*a* Input-side portion of wheel brake line 18
18*b* Output-side portion of wheel brake line 18
19 Wheel brake line
19*a* Input-side portion of wheel brake line 19
19*b* Output-side portion of wheel brake line 19
20 Wheel brake line
20*a* Input-side portion of wheel brake line 20
20*b* Output-side portion of wheel brake line 20
21 Wheel brake line
21*a* Input-side portion of wheel brake line 21
21*b* Output-side portion of wheel brake line 21
22 Inlet valve
23 Inlet valve
24 Inlet valve
25 Inlet valve
26 Check valve
27 Check valve
28 Check valve
29 Check valve
30 Outlet valve
31 Outlet valve
32 Outlet valve
33 Outlet valve
34 Return line
35 Return line
36 Return line
37 Return line
38 Wheel brake cylinder
39 Wheel brake cylinder
40 Wheel brake cylinder
41 Wheel brake cylinder
42 Rotation speed sensor
43 Rotation speed sensor
44 Rotation speed sensor
45 Rotation speed sensor
46 ABS control unit
47 Main pressure line
48 TCS control valve
49 Bypass line
50 Bypass line
51 Collective line
52 Valve block
53 Valve block
54 Valve block
55 Valve block
56 Pressure sensor
57 Pressure sensor
58 Pressure sensor
59 Pressure sensor
60 Control unit for ABS and TCS system
61 Valve casing
62 Valve bore
63 Control piston
64 Control groove
65 Control groove
66 Control groove
67 Control groove 68 Electromagnet
69 Magnet coil
70 Magnet rotor
71 Cable
72 Plug socket
73 Valve spring
74 Port for main pressure line 47
75 Connecting channel
76 Switching channel
77 Switching channel
78 Port for bypass line 49
79 Joining channel
80 Port for bypass line 50
81 Connecting channel
82 Joining channel
83 Port for collective line 51
84 Connecting channel
85 Switching channel
86 Switching channel
87 Port for return line 11
88 Joining channel
89 Port for return line 12
90 Joining channel
91 Vent channel
92 Vent channel
93 Pressure relief groove
94 Pressure relief groove
95 Pressure relief groove
96 Pressure relief groove
97 Valve casing
98 Valve bore
99 Valve bore
100 Control piston
101 Control groove
102 Control piston
103 Control groove
104 Electromagnet
105 Magnet coil
106 Magnet rotor
107 Cable
108 Plug socket
109 Valve spring
110 Electromagnet
111 Magnet coil
112 Magnet rotor
113 Cable
114 Plug socket
115 Valve spring
116 Port for output-side portion 18b of wheel brake line 18
117 Joining channel
118 Switching channel
119 Switching channel
120 Port for input-side portion 18a of wheel-brake line 18
121 Joining channel
122 Port for return line 34
123 Joining channel
124 Valve spring
125 Ball
126 Valve seat
127 Valve bore
128 Connecting channel
129 Connecting channel
130 Vent channel
131 Vent channel
132 Vent channel
133 Vent channel
134 Pressure relief groove
135 Ring groove
136 Pressure relief groove
137 Ring groove
ABS Anti-lock braking system
TCS Traction control system
ATC Automatic Traction Control
ECU Electronic Control Unit

The invention claimed is:

1. An external force-supported hydraulic braking system of a wheeled vehicle, comprising:
two brake circuits each having a main brake line configured to be connected to a pressure-carrying supply line or to a pressureless return line via a brake valve, and further having a number of wheel brake lines branching from the main brake line and each leading to a wheel brake cylinder of a wheel brake, comprising a valve assembly of an ABS system which at each wheel brake has an inlet valve, with a check valve connected in parallel, arranged in the corresponding wheel brake line, and an outlet valve leading from the respective wheel brake cylinder into a return line, and comprising a valve assembly of a TCS system, by means of which a pressure line can be connected directly to the main brake lines and the return lines can be blocked,
wherein the valve assembly of the TCS system has a single TCS control valve formed as a 6/2-way magnetic switching valve configured to, in a non-actuated state, block a pressure-carrying main pressure line against two bypass lines each leading directly to a respective main brake line and connect the two return lines to a pressureless collective line, and further configured to, in the actuated state, connect the main pressure line to the two bypass lines and block the two return lines against the collective line.

2. The braking system as claimed in claim 1, wherein the TCS control valve is configured as a slide valve with a control piston having four control grooves and guided so as to move axially in a valve bore of a valve casing,
wherein the port of the main pressure line branches inside the valve casing into two switching channels which open radially into the valve bore at two mutually spaced axial positions, and in the actuated state of the TCS control valve are each connected via two control grooves of the control piston to a respective joining channel of the bypass lines, and
wherein the port of the collective line branches inside the valve casing into two switching channels which open radially into the valve bore at two further mutually spaced axial positions, and in the non-actuated state of the TCS control valve are each connected via two further control grooves of the control piston to a respective joining channel of the return lines departing from the brake valves.

3. The braking system as claimed in claim 1, wherein for axial pressure relief of the control piston, the TCS control valve includes two vent channels which lead inside the valve casing from the two end faces of the valve bore to a respective switching channel of the collective line.

4. The braking system as claimed in claim 1, wherein for radial pressure relief, the control piston is provided with pressure relief grooves arranged at axial positions at which, in non-actuated or actuated state of the TCS control valve, a respective joining or switching channel opens into the valve bore outside the control grooves of the control piston.

5. The braking system as claimed in claim 1, wherein the inlet valves and the outlet valves of the ABS system are configured as 2/2-way magnetic switching valves, and for each wheel brake cylinder are arranged axially parallel and together with the respective check valve in a valve block with a common valve casing.

6. The braking system as claimed in claim 5, wherein the inlet valves and the outlet valves are each configured as slide valves with a control piston having a single control groove and guided so as to move axially in a valve bore of the valve casing, and wherein the port of the output-side portion of the wheel brake line branches inside the valve casing into two switching channels which each open radially into the valve bore of the inlet valve or outlet valve respectively at two mutually spaced axial positions, and of which, in the non-actuated state of the inlet valve, the one switching channel is connected via the assigned control groove to a joining channel of the wheel brake line, and in the actuated state of the outlet valve, the other switching channel is connected via the assigned control groove to a joining channel of a return line.

7. The braking system as claimed in claim 5, wherein for axial pressure relief of the respective control piston, the inlet valve and the outlet valve each have two vent channels which lead inside the valve casing from the two end faces of the respective valve bore to the joining channel of the return line.

8. The braking system as claimed in claim 5 wherein for radial pressure relief, the control pistons of the inlet valve and the outlet valve are each fitted with a pressure relief groove arranged at an axial position at which, in the actuated state of the inlet valved and in the non-actuated state of the outlet valve, a joining or switching channel respectively opens into the assigned valve bore outside the control groove of the respective control piston.

9. The braking system as claimed in claim 5, wherein the check valve has a ball pressed by a valve spring against the valve seat, and wherein that the check valve is arranged in a valve bore of the valve casing which is connected inside the valve casing on the end side to the port for the output-side portion of the wheel brake line and outside the valve seat to the port for the input-side portion of the wheel brake line.

10. The braking system as claimed in claim 1, wherein at each output-side portion of a wheel brake line, a pressure sensor is connected which is connected via a signal line to a control unit of the ABS and TCS system.

* * * * *